April 13, 1926.
J. S. STRICKLER
1,581,037
CHANGE MAKING AND FARE COLLECTING MACHINE
Filed Oct. 8, 1920
8 Sheets-Sheet 4
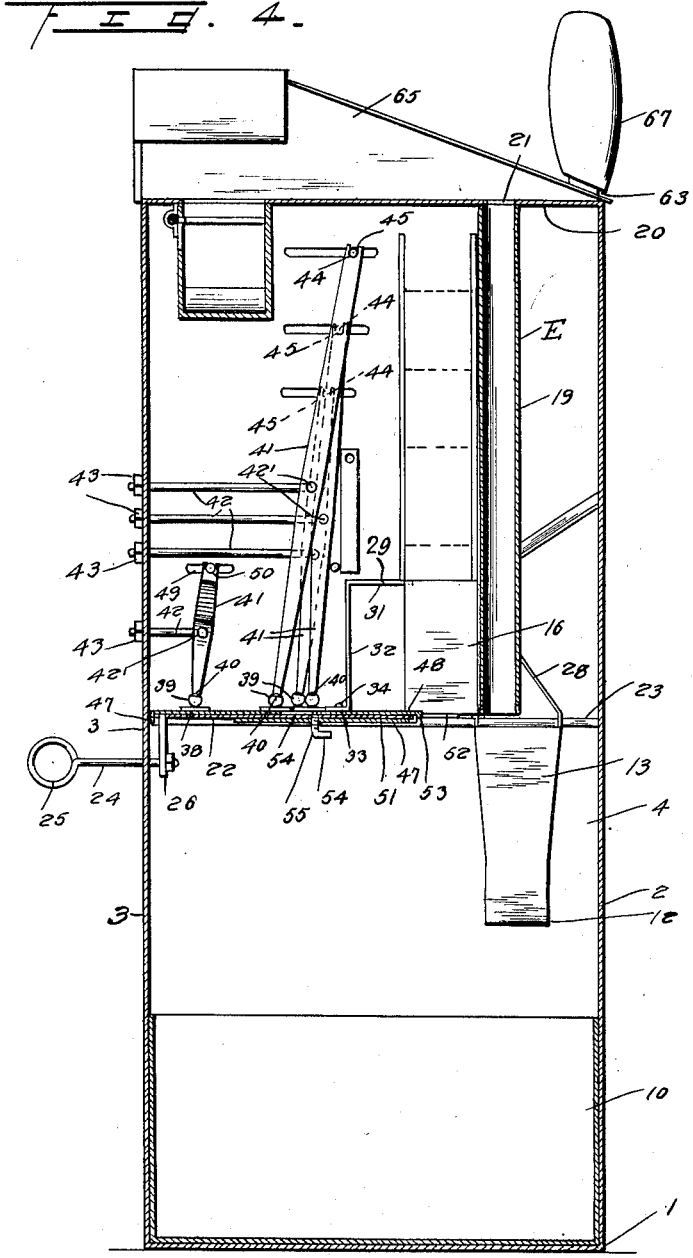
INVENTOR.
J. S. Strickle
BY
, ATTORNEY.

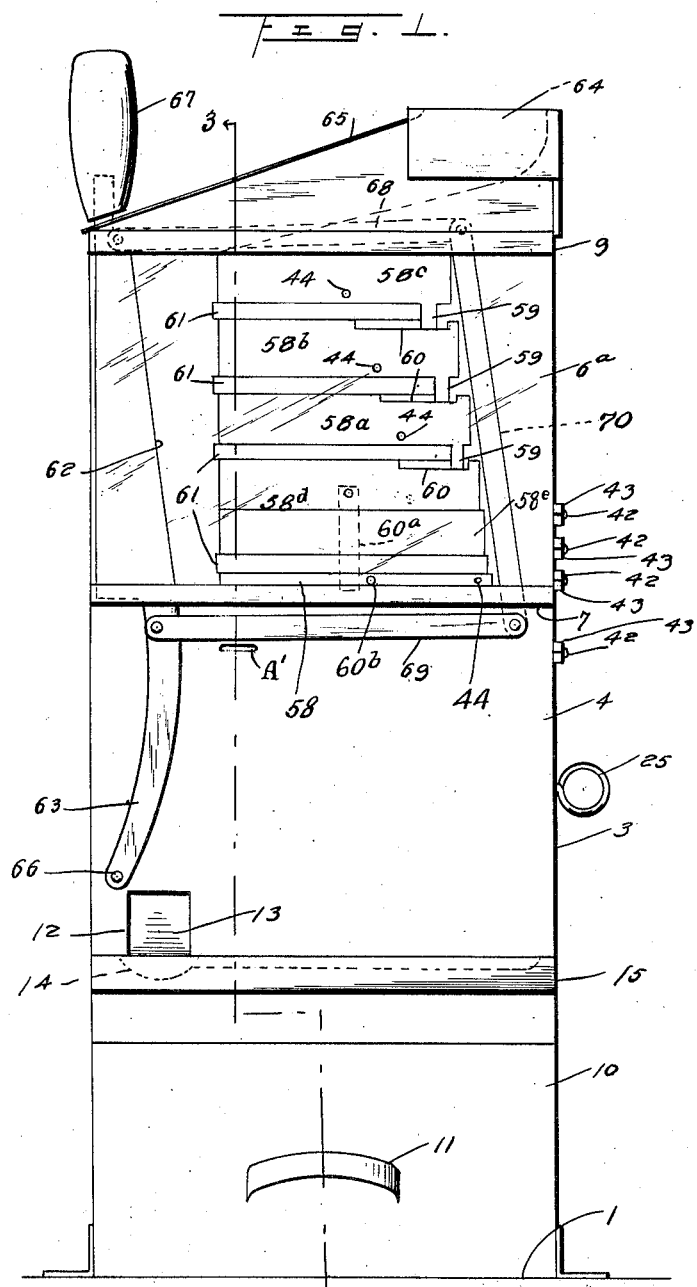

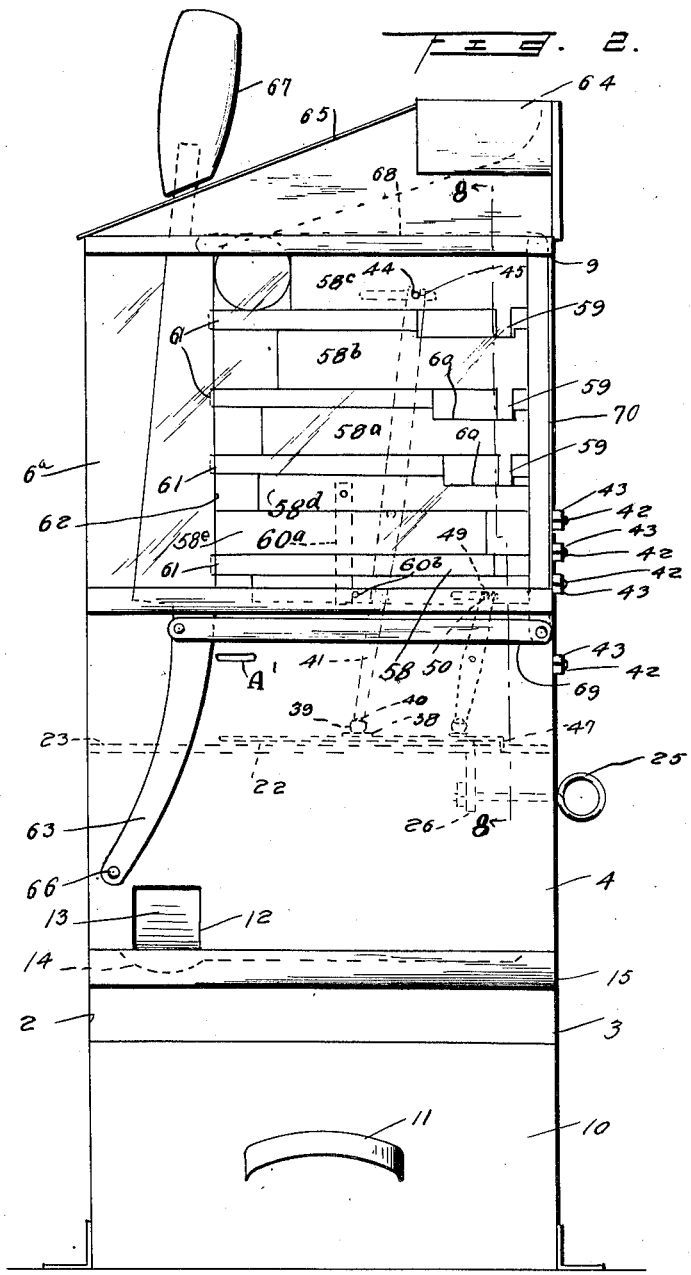

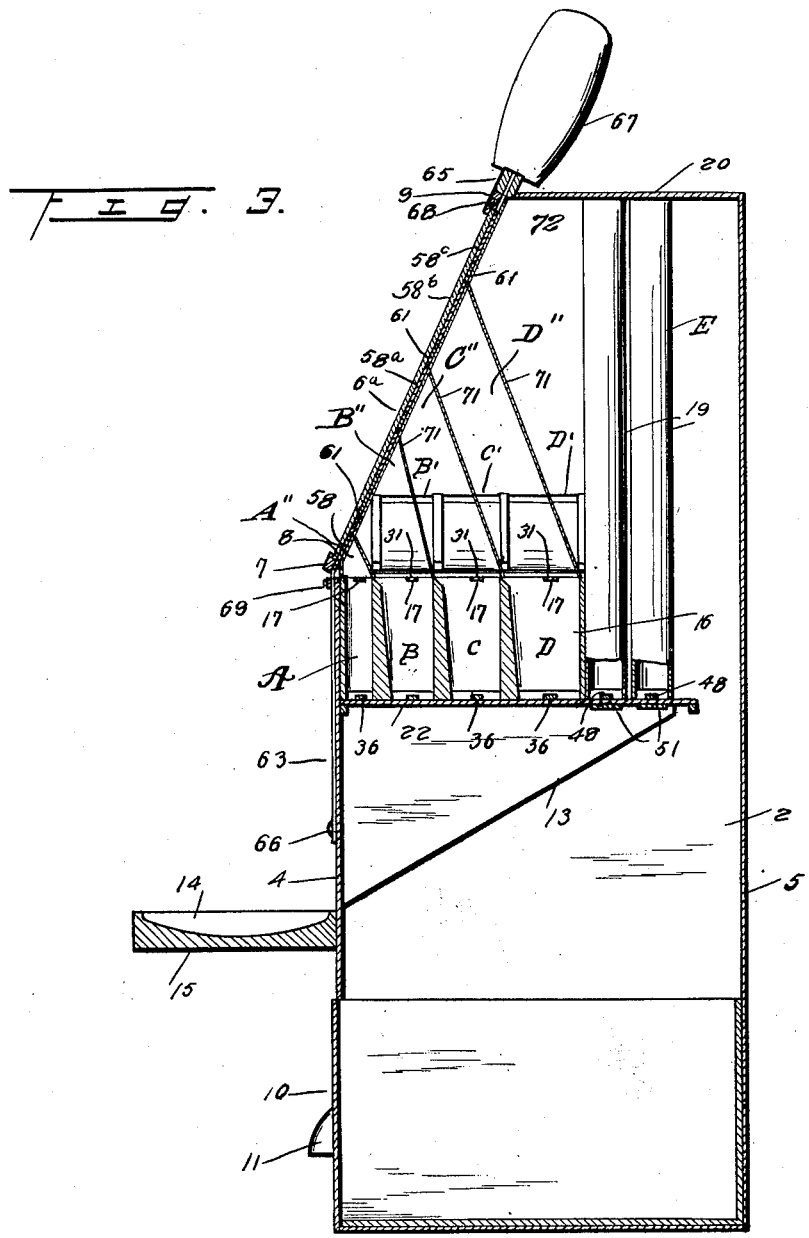

April 13, 1926. 1,581,037
J. S. STRICKLER
CHANGE MAKING AND FARE COLLECTING MACHINE
Filed Oct. 8, 1920　　8 Sheets-Sheet 5
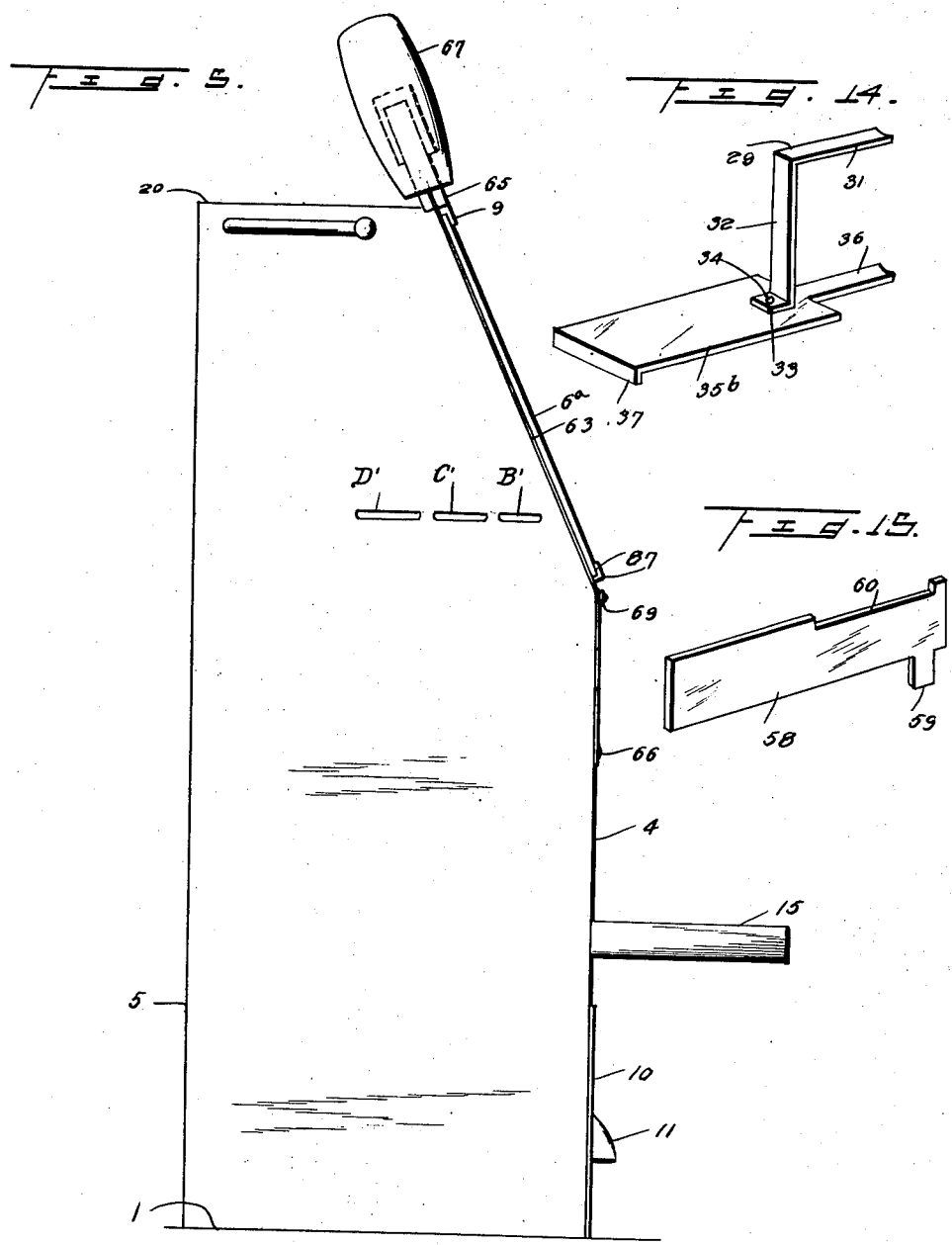
INVENTOR.
J. S. Strickler
BY
ATTORNEY.

April 13, 1926.
J. S. STRICKLER
1,581,037
CHANGE MAKING AND FARE COLLECTING MACHINE
Filed Oct. 8, 1920        8 Sheets-Sheet 6
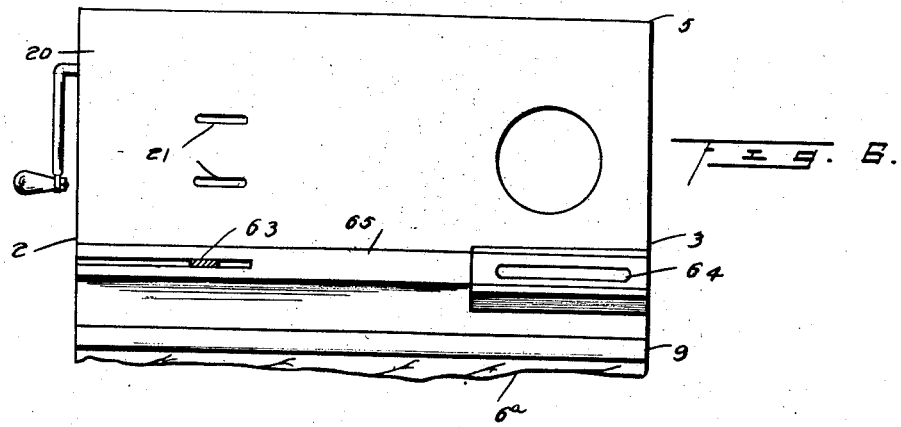
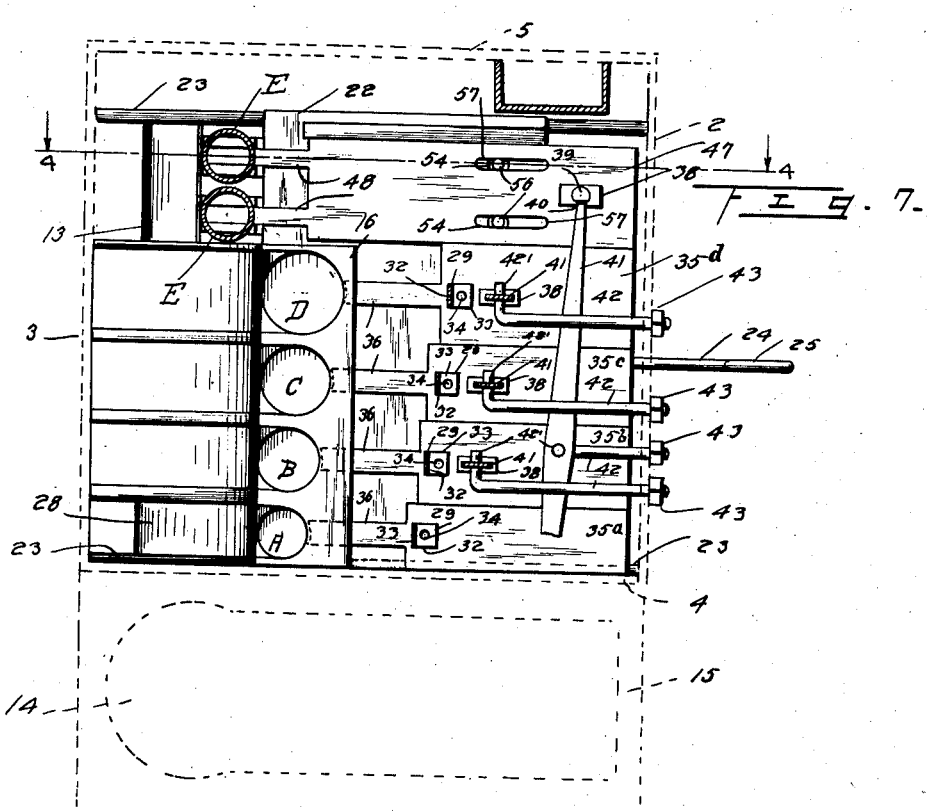
INVENTOR.
J. S. Strickler
BY
ATTORNEY.

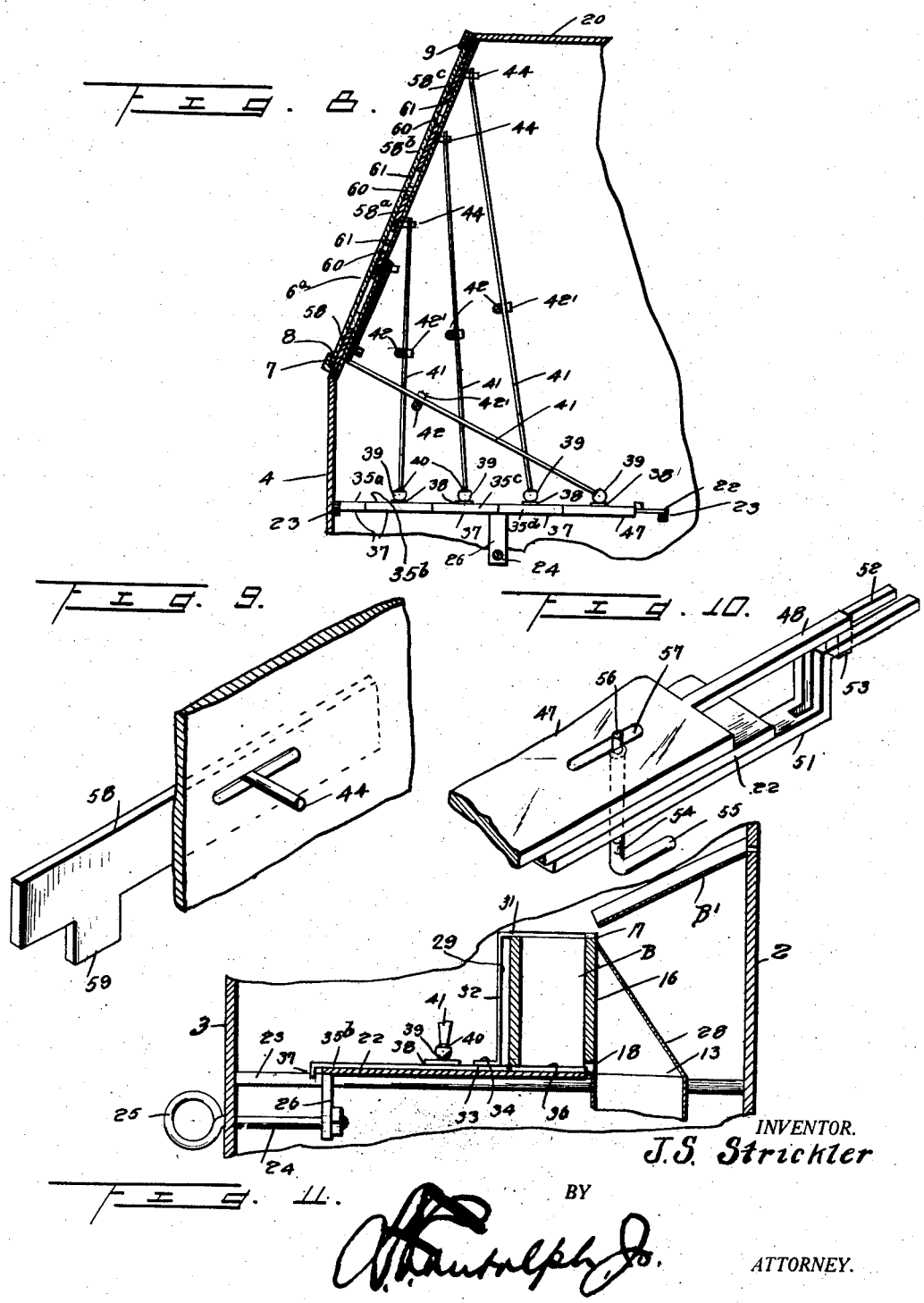

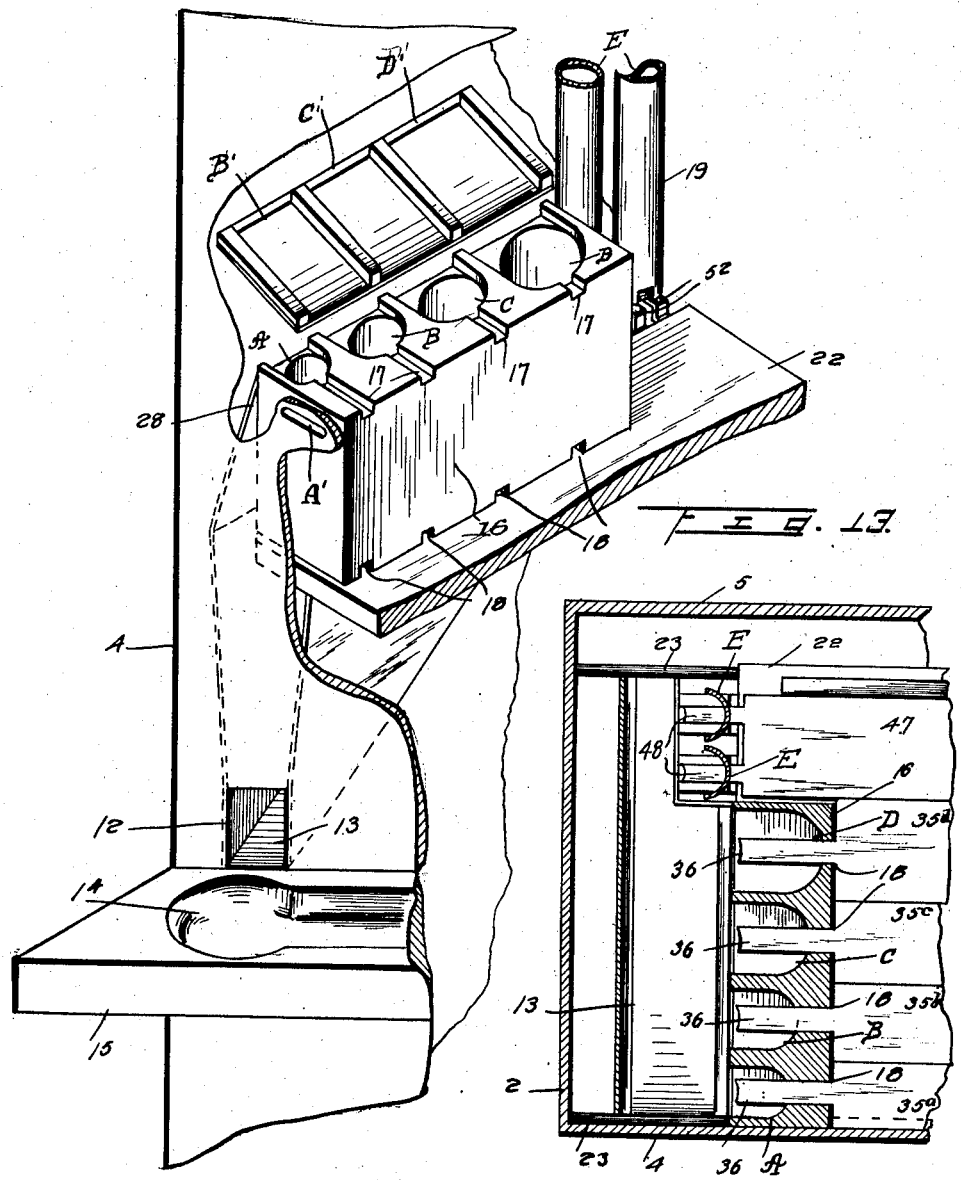

Patented Apr. 13, 1926.

1,581,037

UNITED STATES PATENT OFFICE.

JOSEPH S. STRICKLER, OF ALIQUIPPA, PENNSYLVANIA.

CHANGE-MAKING AND FARE-COLLECTING MACHINE.

Application filed October 8, 1920. Serial No. 415,662.

*To all whom it may concern:*

Be it known that I, JOSEPH S. STRICKLER, a citizen of the United States, residing at Aliquippa, in the county of Beaver and State of Pennsylvania, have invented certain new and useful Improvements in Change-Making and Fare-Collecting Machines; and I do hereby declare the following to be a full, clear, and exact description of the invention, such as will enable others skilled in the art to which it appertains to make and use the same.

This invention has relation to certain new and useful improvements in change making and fare collecting machine and has for its primary object the provision of a machine which will be of such construction and operation that the proper amount of the fare may be deducted automatically from the amount of any coin having a value greater than the amount of the fare and the proper change discharged from the machine after insertion of the coin and operation of the lever.

The invention has for another object the provision of a change making and fare collecting machine of the character stated which will be of such construction and operation that the operative parts may be controlled from a single operating lever regardless of the denomination of the coin deposited in the machine.

The invention has for a further object the provision of a change making and fare collecting machine which will be constructed in such a manner that the different coin tubes will be constructed to contain the proper number of coins required for efficient operation of the machine while a clearing plate is provided for each tube to clear the same of all coins above a predetermined number by passing over the upper ends of the tubes as the machine is operated to clear the tubes of all coins over the number required to fill the tubes and permit the extra coins to drop into the coin drawer at the bottom of the machine.

The invention has for a further object the provision of a coin changing and fare collecting machine of the character stated which will be of such construction that certain parts thereof may be regulated so as to deduct the proper or desired amount from each coin deposited in the machine and cause the operative parts to project the proper change after the fare has been deducted from the total value of the coin.

The invention has for a still further object the provision of a machine of the character stated in which an ejecting slide plate will be employed for each tube and controlled by operating members which may only be operated when the main operating lever is moved in the proper direction after depositing of a coin in the machine.

A still further object of the invention resides in the provision of a plurality of operating members for the various ejecting slide plates arranged so that the operation of the machine may be viewed by the attendant and others.

The invention has for still another object, the provision of a machine of the character stated in which will be included novel and improved operating means for the ejecting slide plates of the various tubes.

Still a further object of the invention resides in the provision of an improved form of main operating lever with returning or resetting strips connected therewith forming a frame for returning to normal position the operating slide by which the ejecting slide plate rock levers are actuated, as the main operating lever is returned to normal position for another operation of the machine.

A still further object of the invention resides in the provision of a machine of the character stated in which all of the parts will be of simple and improved construction and operation and which will be comparatively inexpensive to manufacture.

With the foregoing and other objects in view as will appear as the description proceeds the invention consists in the novel construction, combination and arrangement of cooperating elements as hereinafter more specifically set forth, claimed and shown in the accompanying drawings forming a part of the present application and in which:

Figure 1 is a front elevation of the complete machine, with all of the parts in normal position and the main operating lever set for operation.

Figure 2 is a view similar to Figure 1 showing the operation of the machine when a silver dollar is deposited therein.

Figure 3 is a vertical sectional view on the plane of line 3—3 of Figure 1, looking in the direction indicated by the arrows.

Figure 4 is a vertical sectional view on the plane of line 4—4 of Figure 7, looking in the direction indicated by the arrows.

Figure 5 is a side elevation at right angles to Figures 1 and 2 of the drawings.

Figure 6 is a top plan view of the machine with parts broken away.

Figure 7 is a transverse horizontal section through the machine at a point above the coin tubes and showing the mechanism in plan with the casing in dotted lines.

Figure 8 is a fragmentary vertical section on the plane of line 8—8 of Figure 2, looking in the direction indicated by the arrows.

Figure 9 is a detail perspective view showing the inwardly directed pin carried by one of the operating slide plates controlled by the operating lever.

Figure 10 is a detail perspective view, partly in section, showing the adjustable penny ejecting mechanism.

Figure 11 is a fragmentary vertical section showing one of the coin ejecting slide plates in operated position.

Figure 12 is an enlarged detail perspective view showing the block having the coin tubes formed therein and the principal coin chutes.

Figure 13 is a fragmentary horizontal section, showing the coin ejecting slide plates in the operated positions.

Figure 14 is a detail view of one of the coin ejecting slide plates removed.

Figure 15 is a detail perspective of one of the operating slide plates, removed.

Referring more in detail to the drawing in which similar reference characters designate corresponding parts throughout the several views, 1 indicates the bottom, 2 and 3 the sides, 4 the front and 5 the rear members of the casing and which is preferably of rectangular form both in elevation and cross section, the upper portion of the front member 4 being cut away on a slant and a transparent front plate member 6ª substituted therefor, the purpose of which will presently appear. The lower supporting strip 7 is provided for the transparent front member 6ª and has a groove 8 in its upper edge to accommodate the lower edge of said transparent front member 6ª. An upper supporting strip 9 is also carried on the front of the casing and engaged with the upper edge of the transparent front member 6ª to assist in retaining the latter in proper position. A removable coin receiving drawer 10 is provided in the lower portion of the casing and has a suitable handle 11 on its outer side or front, by means of which the drawer 10 may be readily withdrawn for emptying the machine of the coins within the coin receiving drawer 10; the front member 4 also has a coin discharge opening 12 at the point below the vertical center thereof and at the lower end of the coin discharge chute 13 so as to direct coins to the front pocket 14 formed in the upper face of the shelf 15 projecting from the front of the machine, as clearly shown in the drawings.

Secured within the casing in a suitable manner at a point above the vertical center thereof, is a block 16 having the vertical tubes A B C and D formed therein to accommodate respectively dimes, nickels, quarters and half dollars, the tubes A B C and D opening upon the upper and lower faces of the block 16. The block 16 also has rearwardly directed guide slots 17 and 18 upon the upper and lower faces respectively opposite the center of the tubes A B C and D, said grooves 17 and 18 extending from one longitudinal edge or side of the block 16 to the tubes A B C and D, as shown in Figure 12 of the drawings. A pair of smaller tubes 19 are provided adjacent the block 16 to accommodate pennies and these tubes extend to the top 20 of the casing to receive pennies inserted in the pair of slots 21 formed in said top 20 of the casing.

Slidably mounted beneath the coin tubes A B C D and E is a bottom plate 22, which rides upon a pair of guide rails 23 positioned within the casing 1 as shown in Figures 8 and 13 of the drawings. This bottom plate 22 is adapted to rest beneath the coin tubes A B C D and E to form a bottom or closure therefor. The slide bottom plate 22 may be readily drawn outwardly from beneath the coin tubes A B C D and E in order to allow all of the coins to fall from the tubes into the drawer 10 when desired, however, by means of the withdrawing member 24 having an eye 25 formed on its outer end while its inner end portion extends through a depending arm 26, carried by the bottom plate 22, a suitable fastening or stop member being mounted on the inner end of the withdrawing member 24 to prevent the member 24 from being drawn out of the depending arm 26. It will be understood that the withdrawing member extends through the side wall 3 of the casing, as best shown in Figures 2 and 11 of the drawing.

A slot A' is provided in one side wall of the casing 1 (see Figures 1, 2, and 12) to receive dimes to be deposited in a chute A'' leading to the tube A for supplying this tube with the proper number of dimes before starting operation of the machine. Similar slots B' C' and D' are provided in one side wall of the casing 1 at the upper ends of the filling chutes B'' C'' and D'' for directing nickels, quarters and half dollars to the tubes B C D respectively. An inclined plate 28 extends from one longitudinal edge which will be known thereafter as the rear edge of the block 16, in a downwardly inclined direction to serve as a chute for directing coins from the top of the tubes A B C and D into the cash drawer 10, as will be hereinafter fully described. It will be understood that a space is left between the ends of the chutes A″ B″ C″ and D″ and the block 16 for the coin tube clearing plates to work in. The coin tube clearing plates 29 are provided with curved or concaved operating ends so as to engage the coins above the coin tubes A B C and D and force the same off of the coins within the tubes so that they will fall by gravity into the tray 10. This will keep the extra coins from piling up above the top of the tubes A B C and D. Each of the plates 29 is provided with a guide strip 31 which is adapted to ride in the groove 17 leading to the tube over which the plate 29 is to travel. Each plate 29 has a downwardly directed end portion 32, terminating in an outwardly directed or right angularly directed flange 33 which is adapted to be secured by suitable securing means 34 to one of a series of ejecting plates 35$^a$, 35$^b$, 35$^c$, and 35$^d$ working therebeneath. Each of the tubes A B C and D is provided with one of the coin ejecting plates of series 35$^a$, 35$^b$, 35$^c$ and 35$^d$ adapted to slide across the slide bottom 22 and having a reduced ejecting or operating end 36 adapted to slide through the bottom of the coin tubes and eject the lowermost coin or coins, as the case may be, on to the chute 13 or runway by means of which the coins may reach the pocket 14. Each ejecting plate of the series has its opposite end projecting and terminating in a downward flange 37 which projects over one edge of the slide bottom 22, as shown in Figure 11 of the drawings. Plates 35$^a$ and 35$^b$ are fastened together and move unitarily.

A bearing plate 38 is secured upon the upper face of each of the projecting plates of the series and has a socket 39 formed therein to receive the ball 40 carried on the lower end of the rock arm 41. Each rock arm 41 is pivotally mounted between its ends and at its enlarged or widened portion, on a supporting bar 42. The supporting bars 42 are secured to one of the walls of the casing 1 and have suitable nuts 43 or the like mounted on their outer ends to retain the bars in proper position. It will also be understood that the inner ends of the rods 42 are turned, as shown at 42′, and it is upon the turned ends 42′ of the rods 42 that the rock arms 41 are mounted. This may be readily understood by referring to Figure 8 of the drawings. Rods 44 are engaged by one end of each rock arm 41, resting in the notches 45 formed in the upper end of the rock arms 41, as shown in the drawings. It will be understood that a separate rod 44 is provided for each rock arm 41. The rod 44 connected with the short upstanding rock arm 41 is for operating the double and adjustable coin ejecting plate 47 for the pennies. This plate 47 is provided with a pair of reduced extensions 48 at one end adapted to pass through the lower portion of the penny tubes E. This rock arm 41 is preferably inclined at an angle.

Secured beneath sliding bottom 22 are the supporting members 51 fastened rigidly to the machine and having upwardly offset slotted extensions 52 beneath the penny containing tubes 19 and within which upwardly offset extensions 52 are adapted to operate the ejecting fingers 48 of the plate 47. It will be seen that each ejecting finger 48 has a depending end 53 and the plate 47 may be raised or lowered with respect to the sliding bottom 22 by proper adjustment of the screw 54 threaded through each member 51 and the sliding bottom 22. Each screw 54 has a turned lower end 55 by means of which it may be readily adjusted to raise or lower the plate 47 at the coin tube end only, it being held against such movement at the other end by the connection with the associated arm 41. Each screw 54 also has a smooth upper end portion 56 which is engaged in an elongated slot 57 in the plate 47, as clearly shown in the drawings. It will be seen that the plate 47 may be adjusted so that one or more of the coins in the bottom of each penny containing tube 19 may be ejected by each operation of the machine. Therefore, the machine may be readily adjusted so as to deduct the price of the fare from each coin deposited therein above the value of a nickel or equal to a nickel if the fare to be collected should be less than five cents.

Each rod 44 has its outer forward end connected with an operating slide 58, 58$^a$, 58$^b$ and 58$^c$, respectively, positioned between the inclined portion of the front member of the casing and the transparent member 6$^a$. A slide 58$^d$ and a dummy slide 58$^e$ are disposed between slides 58 and 58$^a$ and are independent of the rocker arms. Slides 58, 58$^a$, 58$^b$ and 58$^c$ are respectively connected to plates 35$^a$, 35$^b$, 35$^c$ and 35$^d$. Each operating slide 58$^a$, 58$^b$ and 58$^c$ has a depending tongue 59 resting in a shallow longitudinal groove 60 in the upper longitudinal face of the operating slide positioned therebeneath. An arm 60$^a$ rigid on the slide 58$^d$ is adapted to abut a pin 60$^b$ on slide 58 so that movement of slide 58$^a$ to the right will also move slide 58. The operating slides of series 58$^a$, 58$^b$ and 58$^c$ are adapted to ride upon stationary guide strips 61 suitably spaced from one another, as clearly shown in Figure 1 of the drawings. When in normal position, the coin receiving ends of the operating slides 58 to 58$^e$ are in alinement and in a plane slightly inwardly of the guide strip 61. The curved edge portion 62 of the main operating lever 63 is spaced opposite the coin receiving ends of the operating slides 58 to 58ᵉ and serves to form the opposite end wall of a series of communicating pockets to receive the coins deposited in the mouth or open upper end 64 of the coin receiving tube 65 which is positioned at the upper forward end of the casing. The lever 63 is pivoted at its lower end by means of a pivot pin 66 or the like, to the casing at a point slightly above one corner of the discharge end of the coin chute 13, as also shown in Figure 1 of the drawings. It will be understood that a suitable handle 67 is mounted upon the upper extended end of the main operating lever 63, whereby this lever may be readily manipulated.

In order to return the operating slide to normal or unoperated position after each operation of the machine, I have provided a return frame carried by the main operating lever 63 and which consists of upper and lower bars 68 and 69, each of which is pivoted at one end to the main operating lever 63. The opposite or outer ends of the upper and lower bars 68 and 69 are connected by the bar 70 of the frame and which engages the operating slides 58 to 58ᶜ at one end and forces said operating slides 58 to 58ᶜ to slide upon the guide strips 61 with the lever 63 when the latter is returned to its normal or unoperated position.

An inclined feed slot 71 is provided for each denomination of coin and into which it may fall by gravity through an appropriate aperture in the back plate after being moved over in the machine between the main operating lever 63 and the operating slides of series 58 to 58ᶜ. As soon as the coin reaches the end of the feed slot 71 the coin will fall through the same and pass to the proper one of the coin tubes A B C D and E. If it should be a dollar coin it will pass through the feed passage 72 and directly to the coin drawer 10 as the dollar coin would not be used for making change.

From the foregoing description, taken in connection with the accompanying drawings forming a part of the present invention, it will be readily seen that the operating slides of series 58 to 58ᶜ are arranged in such a manner that the proper slide will be operated by the coin deposited in the machine and all of the operating slides of series 58 to 58ᶜ beneath this slide will be carried across the machine so as to operate the ejecting plates of series 35 to 35ᶜ and 47 to eject the proper number of coins so as to give the change or the difference between the amount represented by the coin deposited and the amount to be deducted for the fare.

In operation, if a dime is deposited it will be caught and held between the edge 62 and adjacent end of the slide 58. Upon lever 63 being moved toward the slide 58 the dime will be pushed against that slide, accordingly moving the slide which imparts motion to the rocker 41 connected thereto and accordingly actuate plate 47 which ejects two pennies from tube 19 in the chute 13 so that they will travel into the tray 14, thus constituting the change. Lever 63 is thereafter retracted to restore the parts to normal position and during retraction the dime is released by the lever and falls by gravity through its aperture in the back plate into the tube "A". Likewise when two nickels are deposited between slides 58ᵈ and 58ᵉ, movement of said lever 63 will particularly move slide 58ᵈ and its arm 60ᵃ will strike pin 60ᵇ and operate slide 58 similar to the deposit of a dime thus giving two pennies in change. A single nickel will not operate the machine since it merely operates the dummy slide 58ᵉ which has no operative connection with the change making parts and then falls to the coin tray or drawer 10. If a quarter is deposited and caught between lever 63 and slide 58ᵃ, movement of lever 63 will slide part 58ᵃ, rocking the arm 41 connected thereto and accordingly moving the plates 35ᵃ and 35ᵇ which operate together because of the arrangement of the slides 58 to 58ᵉ, to thereby eject a nickel and a dime. This will also eject two pennies to complete the change of seventeen cents as the dependent 59 on slide 58ᵃ will move the nickel slide 58ᵈ and dime slide 58 in the manner aforesaid. If a half dollar is deposited, upon lever 63 being moved, slide 58ᵇ will operate its rocker arm 41 to actuate the plate 35ᵈ and thereby eject a quarter in addition to ejecting seventeen cents in the manner previously described, due to coaction of the dependent 59 on slide 58ᵇ with slot 60 of slide 58ᵃ. Likewise a dollar moved by lever 63 against slide 58ᶜ will actuate all of the slides below it, due to its dependent 59 and slot 60 cooperating therewith and will give all of the change aforesaid and in addition will give fifty cents as the rocker 41 for the slide will actuate plate 35ᵈ. At the time the lever 63 is moved back to normal position, the slides will be restored by bar 70 to normal position. The drawer 10 may be emptied at desired intervals.

While the preferred embodiment of the invention has been shown and described, it will be understood that minor changes in the details of construction and arrangement of parts may be resorted to within the scope of what is claimed without departing from the spirit of the invention.

What is claimed is:—

1. A machine of the class described having coin ejecting mechanism, coin-operable relatively movable slides to actuate said mechanism, and a return frame for said slides comprising articulate parts surrounding the slides jointly with the lever.

2. A machine of the class described having coin-operable slides, said slides being movable relatively to each other, coin ejecting means operable by said slides, and a return frame for said slides comprising articulate parts surrounding the slides jointly with the lever.

3. A machine of the class described having relatively movable superposed slides each engageable by a coin of the same denomination, means to unitarily move the coins engaged with said slides against said slides to actuate the latter, coin ejecting means operable through the movement of the uppermost slide, the lowermost slide being independent of said ejecting means, whereby a single coin cannot operate the ejecting means.

4. A machine of the class described having an operating lever, relatively movable slides arranged in coacting relation with said lever, said slides being interconnected and adapted to be individually moved by the presence of a coin between the same and said lever, ejecting mechanism operable by said slides, a dummy slide associated with one of the first mentioned slides and adapted for actuation by a coin of similar denomination thereto, and a return frame for said slides consisting of bars pivoted together and to said lever and jointly with the lever surrounding the slides.

5. A machine of the class described having a coin operable slide, ejecting mechanism operable by said slide, a second coin-operable slide, an arm extending from one of said slides, and means on the other slide engageable by said arm whereby said slides will move in unison and a dummy slide movable relatively to the aforesaid slides and interposed between them and adapted for actuation by a coin of similar denomination to one of said first mentioned slides.

In testimony whereof I affix my signature.

JOSEPH S. STRICKLER.